United States Patent [19]

Heidingsfeld et al.

[11] Patent Number: 5,536,781
[45] Date of Patent: Jul. 16, 1996

[54] PROCESS FOR THE PREPARATION OF PLASTICS CONTAINING THERMOPLASTIC POLYURETHANES

[75] Inventors: Herbert Heidingsfeld, Frechen; Willi Meister, Dormagen; Jürgen Winkler, Leverkusen, all of Germany

[73] Assignee: Bayer Aktiengesellschaft, Leverkusen, Germany

[21] Appl. No.: 457,961

[22] Filed: Jun. 1, 1995

Related U.S. Application Data

[62] Division of Ser. No. 289,457, Aug. 12, 1994, Pat. No. 5,455,312, which is a continuation of Ser. No. 580,691, Sep. 11, 1990, abandoned.

[30] Foreign Application Priority Data

Sep. 15, 1989 [DE] Germany ............................ 39 30 838.3

[51] Int. Cl.⁶ .......................... C08L 75/04; C08L 55/02; C08L 69/00; C08L 77/00
[52] U.S. Cl. ............................ 525/66; 524/590; 525/424; 525/454; 525/457
[58] Field of Search .................. 524/590; 525/66, 525/424, 454, 457

[56] References Cited

U.S. PATENT DOCUMENTS

| 2,948,707 | 8/1960 | Benning | 260/77.5 |
| 3,214,411 | 10/1965 | Saunders et al. | 260/75 |
| 4,191,818 | 3/1980 | Illers et al. | 528/44 |
| 4,261,946 | 4/1981 | Goyert et al. | 264/211 |
| 4,347,338 | 8/1982 | Torii et al. | 525/123 |
| 4,500,671 | 2/1985 | Goyert et al. | 524/494 |

FOREIGN PATENT DOCUMENTS

63-179987 7/1988 Japan.

*Primary Examiner*—Thomas Hamilton, III
*Attorney, Agent, or Firm*—Joseph C. Gil; Aron Preis

[57] ABSTRACT

The present invention relates to a process for the preparation of plastics containing thermoplastic polyurethanes and optionally other components comprising (a) melting and homogenizing a thermoplastic polyurethane in an extruder, and (b) adding an isocyanate to said extruder containing the melted and homogenized thermoplastic polyurethane.

6 Claims, No Drawings

PROCESS FOR THE PREPARATION OF PLASTICS CONTAINING THERMOPLASTIC POLYURETHANES

This application is a division of application Ser. No. 08/289,457 filed Aug. 12, 1994, now U.S. Pat. No. 5,455,312, which is a Continuation of Ser. No. 07/580,691 filed Sep. 11, 1990, now abandoned.

BACKGROUND OF THE INVENTION

This invention relates to a new process for the preparation of plastics containing thermoplastic polyurethanes ("TPU"). It is known from U.S. Pat. No. 3,214,411 that the starting compounds for TPU, particularly isocyanates, chain extenders, and polyols, can be transferred from a mixer to a belt to form a polyurethane. The polyurethane obtained is subsequently size-reduced and homogenized in extruders to form granulates. This process is known as "refining".

It is also known that preformed TPU can be mixed together with other components, such as glass fibers, polycarbonates, or other polymers (such as ABS, for example), in an extruder and the resultant blend subsequently granulated. This process is known as compounding.

In addition, German Offenlegungsschrift 2,854,406 describes a process for preparing a thermoplastic material in which fibrous reinforcing materials and polar polymers are added to the polyurethane-forming components before or after preparation of a thermoplastic polyurethane in a twin-screw extruder. The disadvantage of the known compounding or refining process is that the thermoplastic polyurethane elastomers are damaged by high friction and exposure to high temperatures. This damage leads to a reduction in tensile strength, impact strength at low temperatures, and viscosity. Partly crystalline products lose their crystallinity, leading to lower solidification rates. The damage caused by friction is proportional to the viscosity of the starting material, the degree of degradation not being sufficiently controllable.

The object of the present invention was to provide an improved process for the preparation of plastics containing thermoplastic polyurethanes. More particularly, the purpose of the invention was to improve compounding or refining.

SUMMARY OF THE INVENTION

The present invention relates to a process for the preparation of plastics containing thermoplastic polyurethanes ("TPU") and optionally other components comprising
(a) melting and homogenizing the TPU in an extruder, and
(b) adding an isocyanate to said extruder containing the melted and homogenized TPU.

DETAILED DESCRIPTION OF THE INVENTION

In a preferred embodiment, the TPU as introduced into the extruder has an isocyanate index of less than 1 (preferably from 0.9 to 0.95). By isocyanate index is meant the ratio of NCO groups to NCO-reactive groups during the formation of the corresponding TPU.

In another preferred embodiment, the isocyanate is added to the extruder in a quantity such that the isocyanate index is elevated to a value of 1.0 to about 1.05.

The thermoplastic polyurethanes, which are known materials produced by known methods, are generally prepared from substantially linear long-chain polyols having a molecular weight of 400 to 10,000, diisocyanates, and chain-extending agents (preferably short-chain polyols) having a molecular weight of up to 400. The NCO:OH ratio is generally from 0.95 to 1.10.

Suitable substantially linear polyols having molecular weights in the range from 400 to 10,000 (preferably in the range from 800 to 6,000) may be selected from virtually any known polyesters, polylactones, polyethers, polythioethers, polyester amides, polycarbonates, polyacetals preferably containing two and, in small quantities, possibly even three Zerewitinoff-active groups (essentially hydroxyl groups); vinyl polymers, such as polybutadiene diols; polyhydroxyl compounds already containing urethane or urea groups; optionally modified natural polyols; and other compounds containing Zerewitinoff-active groups, such as amino, carboxyl or thiol groups. Such compounds are known and are described in detail, for example, in German Offenlegungsschriften 2,302,564, 2,423,764, 2,549,372 (U.S. Pat. No. 3,963,579), and 2,402,840 (U.S. Pat. No. 3,984,607) and German Auslegeschrift 2,457,387 (U.S. Pat. No. 4,035,213), It is preferred to use hydroxyl-containing polyesters of glycols and adipic acid, phthalic acid, and/or terephthalic acid and hydrogenation products thereof, hydroxyl polycarbonates, polycaprolactams, polyethylene oxide, polypropylene oxide, polytetrahydrofuran, and mixed polyethers of ethylene oxide and propylene oxide.

Suitable isocyanates for use in preparing the thermoplastic polyurethanes and for adding to the melt according to the invention include the known aliphatic, cycloaliphatic, aromatic, araliphatic, and heterocyclic isocyanates of the type described, for example, in the above-cited German Offenlegungsschriften 2,302,564, 2,423,764, 2,549,372 (U.S. Pat. No. 3,963,579), and 2,402,840 (U.S. Pat. No. 3,984,607) and German Auslegeschrift 2,457,387 (U.S. Pat. No. 4,035,213). The preferred isocyanates according to the invention are diisocyanates, preferably hexamethylene diisocyanate, isophorone diisocyanate, and 4,4'-diisocyanato-diphenylmethane optionally substituted by methyl groups.

The diisocyanates may optionally be used together with up to about 15 mole-percent (based on diisocyanate) of a polyisocyanate of relatively high functionality, but the quantity in which the relatively high functionality polyisocyanate is used must be limited so that a still fusible or thermoplastic product can be obtained. A relatively large quantity of relatively high functionality isocyanates must generally be compensated by the use of, on average, less than difunctional hydroxyl or amino compounds (or even monoisocyanates), so that excessive chemical crosslinking of the product is avoided. However, it is, of course, also possible to conduct the reaction in such a way that subsequent chemical crosslinking of the elastomer takes place during storage (for example, through the use of an excess of compounds containing NCO groups). Examples of relatively high functionality isocyanates and monofunctional compounds can also be found in the prior art cited above and include, for example, monoamines, such as butylamine and dibutylamine, octylamine, stearyl amine, N-methyl stearylamine, pyrrolidine, piperidine, and cyclohexylamine, and monoalcohols, such as butanol, 1-ethylhexanol, octanol, dodecanol, amyl alcohols, cyclohexanol, and ethylene glycol monoethyl ether.

Suitable chain-extending agents are also known and are described, for example, in German Offenlegungsschrift 2,302,564, 2,323,764, 2,549,372, 2,402,799, 2,402,840, and 2,457,387. Such chain extenders include low molecular weight polyalcohols (preferably glycols), polyamines, hydrazines, and hydrazides, as well as aminoalcohols, such as ethanolamine, diethanolamine, N-methyl diethanolamine, triethanolamine, and 3-aminopropanol. Preferred chain-extending agents are ethylene glycol, di- and triethylene glycol, 1,2-propanediol, 1,3- and 1,4-butanediol, 1,6-hexanediol, 2-ethyl-1,3-hexanediol, 2,2-dimethylpropanediol, 1,4-bis(hydroxymethyl)cyclohexane, and hydroquinone dihydroxyethyl ether. Hydroquinone di-β-hydroxyethyl ether, 1,4-butanediol, and 1,6-hexanediol are particularly preferred.

In one particularly preferred embodiment of this invention, the thermoplastic polyurethane is blended with reinforcing materials, particularly fibrous reinforcing materials, in an extruder. Inorganic fibers are preferred to organic fibers as fibrous reinforcing materials because they have a better reinforcing effect. In addition, the heat resistance of inorganic fibers is more favorable. Preferred inorganic fibers for the present invention are, in particular, sized glass fibers having a thickness of 8 to 30 μm (preferably 10 to 18 μm) and a length of 0.3 mm to about 100 mm (preferably 1 to 10 mm) that are produced by known methods.

The glass fiber sizes consist essentially of two components, namely, a film-forming component (generally polyvinyl acetate, polyesters, polyurethanes or epoxy resins) and a coupling agent (generally an organosilicon compound). In the case of the polyurethane-based sizes preferably used in accordance with the invention, at least one coupling agent containing amino groups should be present. In addition, the glass fiber sizes may also contain known antistatic agents and lubricants, as detailed in German Offenlegungsschrift 2,302,564 (U.S. Pat. No. 3,963,679).

In another preferred embodiment, known polymers that are compatible with and different from the thermoplastic polyurethanes may be introduced into the extruder in addition to or instead of the reinforcing materials to form a blend. Particularly preferred polymers for this purpose are polycarbonates and acrylonitrile/butadiene/styrene terpolymers ("ABS"), more especially ABS, although polyamides are also suitable.

Suitable extruders are known and are described, for example, in German Patentschriften 813,154, 862,668, and 940,109, U.S. Pat. Nos. 3,233,025 and 3,642,694, German Offenlegungsschriften 2,447,368 and 2,610,980, and, in particular, in German Auslegeschrift 2,302,564 and German Offenlegungsschriften 2,549,372 (U.S. Pat. No. 3,963,679).

The residence times of the melt in the screw extruder are generally from 0.3 to 30 minutes and preferably from 0.5 to 4 minutes. The temperature of the screw housing is between about 60° and 300° C. (approximately 80° to 280° C. in the feed zone; approximately 100° to 300° C. in the middle of the extruder; and approximately 60 to 250° C. in the discharge zone). The melt issuing from the extruder is quenched and size-reduced by methods known in the art. The end products of the process may be processed as thermoplastics by standard methods.

The materials obtained in accordance with the invention are particularly suitable for use as a structural material in the manufacture of exterior bodywork parts.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all quantities are given in parts by weight or percentages by weight.

EXAMPLES

Werner & Pfleiderer (Stuttgart) type ZSK twin-screw kneaders with self-cleaning screws were used. The same screw design with a kneading element share of approximately 20% was used for all of the Examples. The function and mode of operation of the screw kneader, kneading and feed elements of the screw design, and so forth are described in detail in Werner & Pfleiderer's technical literature and in German Offenlegungsschrift 2,302,564 (U.S. Pat. No. 3,963,679).

The fibers used in the Examples are commercially available glass fibers 4.5 mm long and 11 μm in diameter that are sized in accordance with Example 1 of German Auslegeschrift 2,426,657.

The following substances were used in the Examples:
PU 1 polyurethane elastomer based on polybutanediol adipate, hexanediol, butanediol, and diphenylmethane diisocyanate
PU 2 polyester urethane elastomer based on polybutanediol diethylene glycol adipate, butanediol, and diphenylmethane diisocyanate
PU 3 polyurethane based on polyether, polycarbonate, butanediol, and diphenylmethane diisocyanate
PU4 polyester urethane elastomer based on polybutanediol adipate, hexanediol, butanediol, and diphenylmethane diisocyanate
PC 1 Makrolon CD 2000 polycarbonate
PMMA PLEXIGLAS® type V 920 acrylic sheet (Röhm Gmb)
Isocyanate—diphenylmethane diisocyanate
Glass fibers—chopped strands, E-glass, diameter 11 μm, length 4.5 mm, polyurethane-sized
Additives
Antioxidant—tetra((2,6-di-tert-butyl)phenyl-4-propionic acid) neopentyl ester
Hydrolysis stabilizer—bis(diisopropylphenyl)carbodiimide Example 1

A Werner & Pfleiderer type ZSK 53 V twin-screw extruder with self-cleaning screws was used. The length of the processing section (12 housings) corresponds to approximately 42 times the screw diameter. The polyurethane PU 1, the polycarbonate PC 1, and the PMMA were mixed in a drum mixer in the ratios indicated in Table 1. A weigh feeder preceding the twin-screw extruder and connected to housing 1 of the extruder was charged with the mixture of polymer components.

The isocyanate and the antioxidant were introduced into the extruder through housing 4 by another two differential weigh feeders.

The open housings were blanketed with nitrogen.

The individual components were homogenized in the extruder at 220° to 250° C. at full screw speed (total throughput 100 to 150 kg/h). The issuing strands were cooled with cooling water to approximately 60° C. and then granulated. Thereafter, the final compound needed to be dried for 1 hour at 110° C. before subsequent processing (i.e., injection molding).

As indicated in Table 1, a distinct improvement in notched impact strength can be obtained by the addition of an isocyanate.

TABLE 1

| Thermoplastic polyurethane/polycarbonate compounds | | | | | | | | |
|---|---|---|---|---|---|---|---|---|
| PU 1 (parts) | PC 1 (parts) | Anti-oxidant Irganox 1010 (parts) | PMMA (parts) | Isocyanate (parts) | Tensile strength (MPa) | E modulus (MPa) | MVI 220° C. (g/10 m) | Impact strength at 25° C. (kj/m$^2$) |
| 50:11 | 61 | 0.1 | 1.5 | — | 43.8 | 1340 | 77.8 | 12.6 |
| 50:11 | 61 | 0.1 | 1.5 | 0.5 | 51.1 | 1385 | 73.3 | 21.8 |
| 50:11 | 61 | 0.1 | 1.5 | 1 | 51.8 | 1378 | 51.9 | 39 |
| 50:11 | 61 | 0.1 | 1.5 | 1.5 | 53.4 | 1427 | 42.8 | 52.9 |
| 50:11 | 61 | 0.1 | 1.5 | 2 | 58.6 | 1439 | 41.6 | no breakage |

Example 2

The thermoplastic polyurethanes PU 2 and PU 3 were refined with and without addition of isocyanate. A Werner & Pfleiderer type ZSK 120 (length approximately 22 times the screw diameter) was used. The thermoplastic polyurethanes PU 2 or PU 3 were added to housing 1 of the extruder through a differential weigh feeder, and the necessary isocyanate was added to housing 1 through a separate weigh feeder. The corresponding changes in solution viscosity are shown in Table 2 for unconditioned granulate and for granulate conditioned for 5 hours at 120° C.

TABLE 2

Effect of added isocyanate on viscosity of thermoplastic polyurethanes

| | Solution viscosity (10% dimethylformamide at 25° C.) (mPa · s) | |
|---|---|---|
| | Granulate unconditioned | Granulate conditioned |
| PU 2 + 1% MDI | 900 | 7200 |
| PU 2 without MDI | 700 | 1500 |
| Unrefined PU 3 | 2500 | 8800 |
| PU 3 + 1.5% MDI | 1500 | 18000 |
| PU 3 without MDI | 1100 | 1250 |

Example 3

A Werner & Pfleiderer type ZSK 83 twin-screw extruder was used. The length of the processing section (10 housings) corresponds to approximately 33 times the screw diameter. The polyurethane PU 4 and the additives (antioxidant Irganox 1010 and hydrolysis stabilizer in a ratio of 1:4) were mixed in a drum mixer in the ratios indicated in Table 3. A weigh feeder preceding the twin-screw extruder and connected to housing 1 of the extruder was charged with the mixture of the PU 4 and additives.

The glass fibers (chopped strands, 4.5 mm length, 11 μm diameter, polyurethane sized) was introduced into the extruder through housing 4 by means of a differential weigh feeder. The isocyanate was introduced into the extruder through housing 4 by means of a separate differential weigh feeder. The improvement in impact strength where MDI is used is shown in Table 3.

TABLE 3

| Thermoplastic polyurethanes containing 20% glass | | | | | | | |
|---|---|---|---|---|---|---|---|
| PU 4 (parts) | Additive (parts) | Glass fiber (parts) | MDI (parts) | Tensile strength (MPA) | Limit flexural stress (MPa) | E modulus (MPa) | Impact strength at 25° C. (kj/m$^2$) |
| 80 | 2.2 | 21 | 1.8 | 70–80 | 70–80 | 2200 | 50–60 |
| 80 | 2.2 | 21 | without | 50–60 | 65–75 | 2000 | 17–23 |

What is claimed is:

1. A process for the production of plastics containing thermoplastic polyurethane comprising
    a) introducing a thermoplastic polyurethane having an isocyanate index below 1 and a thermoplastic polymer which is compatible with said thermoplastic polyurethane into a twin screw extruder,
    b) melting and homogenizing the thermoplastic polyurethane and said thermoplastic polymer in said twin screw extruder to form a homogeneous melt, and
    c) adding to said homogeneous melt an isocyanate in an amount such that the isocyanate index of said melt is increased to an index of from 1.00 to 1.05.

2. The process of claim 1 wherein thermoplastic polymer which is compatible with said thermoplastic polyurethane is at least one member selected from the group consisting of polycarbonate, ABS and polyamide.

3. A process for the production of plastics containing thermoplastic polyurethane comprising
    a) introducing a thermoplastic polyurethane having an isocyanate index below 1 and a reinforcing material into a twin screw extruder,
    b) melting and homogenizing the thermoplastic polyurethane and said reinforcing material in said twin screw extruder to form a homogeneous melt, and
    c) adding to said homogeneous melt an isocyanate in an amount such that the isocyanate index of said melt is increased to an index of from 1.00 to 1.05.

4. The process of claim 2 wherein said reinforcing material is an inorganic fiber.

5. A process for the production of exterior bodywork parts comprising molding the plastic containing thermoplastic polyurethane produced by the process of claim 2.

6. A process for the production of exterior bodywork parts comprising molding the plastic containing thermoplastic polyurethane produced by the process of claim 3.

* * * * *